US011163478B2

(12) United States Patent
Muthiah et al.

(10) Patent No.: US 11,163,478 B2
(45) Date of Patent: Nov. 2, 2021

(54) REDUCING THE AMOUNT OF DATA TRANSFERRED TO REMOTE STORAGE LOCATIONS FOR MODIFIED OBJECTS

(71) Applicant: International Business Machines Corporation, Armonk, NY (US)

(72) Inventors: Muthu Annamalai Muthiah, Chennai (IN); Archana Chinnaiah, Bangalore (IN); Karrthik Kalaga Gopalakrishnan, Bengaluru (IN); Jijo Varghese, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 16/134,606

(22) Filed: Sep. 18, 2018

(65) Prior Publication Data

US 2020/0089408 A1    Mar. 19, 2020

(51) Int. Cl.
*G06F 3/06* (2006.01)

(52) U.S. Cl.
CPC ............ *G06F 3/065* (2013.01); *G06F 3/0604* (2013.01); *G06F 3/064* (2013.01); *G06F 3/067* (2013.01)

(58) Field of Classification Search
CPC .......... G06F 3/064; G06F 3/065; G06F 3/067; G06F 3/0604; G06F 3/0641
See application file for complete search history.

(56) References Cited

U.S. PATENT DOCUMENTS

| | | | | |
|---|---|---|---|---|
| 6,327,671 B1 * | 12/2001 | Menon | ................ | G06F 11/2066 707/999.2 |
| 7,246,119 B2 * | 7/2007 | Kuwata | ................ | G06F 16/958 707/608 |
| 8,380,686 B2 * | 2/2013 | Wolfgang | ........... | G06F 11/2071 707/695 |
| 8,438,353 B1 | 5/2013 | Ramanathan et al. | | |
| 9,578,130 B1 * | 2/2017 | Nguyen | ................ | H04L 67/32 |
| 9,665,306 B1 | 5/2017 | Patwardhan | | |
| 9,716,754 B2 * | 7/2017 | Swift | ................ | H04L 67/1095 |

(Continued)

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.

(Continued)

*Primary Examiner* — Tuan V Thai
(74) *Attorney, Agent, or Firm* — Zilka-Kotab, P.C.

(57) ABSTRACT

A computer-implemented method, according to one embodiment, includes: receiving, by a computer, a data access request; sending, by the computer, a recall request to a remote storage location for data which corresponds to the data access request; and receiving, by the computer, a copy of an existing object which includes blocks. The data which corresponds to the data access request is stored in at least one of the blocks. The data access request is satisfied, by the computer, by providing the copy of the existing object. Moreover, a sparse object, which only includes ones of the blocks which contain data that has been modified, is received by the computer. The sparse object is sent, by the computer, to the remote storage location; and one or more instructions to use the blocks included in the sparse object to update the existing object are also sent by the computer.

19 Claims, 10 Drawing Sheets

(56) References Cited

U.S. PATENT DOCUMENTS

| | | | |
|---|---|---|---|
| 9,852,149 B1 | 12/2017 | Taylor et al. | |
| 9,898,241 B2* | 2/2018 | Nagahara | G06F 3/0488 |
| 10,061,777 B1* | 8/2018 | Davis | G06F 16/10 |
| 2005/0131939 A1* | 6/2005 | Douglis | G06F 11/1453 |
| 2006/0179151 A1* | 8/2006 | Yanamoto | H04L 12/64 709/230 |
| 2007/0043674 A1* | 2/2007 | DiFalco | G06Q 10/00 705/51 |
| 2010/0332401 A1* | 12/2010 | Prahlad | G06F 3/0649 705/80 |
| 2011/0314145 A1* | 12/2011 | Raleigh | H04M 15/43 709/224 |
| 2013/0159647 A1* | 6/2013 | Kabano | G06F 16/1727 711/162 |
| 2014/0032850 A1 | 1/2014 | Phelan et al. | |
| 2019/0114232 A1* | 4/2019 | Squires | G06F 15/17331 |

OTHER PUBLICATIONS

Mell et al., "The NIST Definition of Cloud Computing," Version 15, Dec. 7, 2009, pp. 1-2.
Mell et al., "The NIST Definition of Cloud Computing," Recommendations of the National Institute of Standards and Technology, NIST Special Publication 800-145, Sep. 2011, pp. 1-7.
CSRC, "Cloud Computing," Computer Security Resource Center, Oct. 2017, 3 pages, retrieved from https://csrc.nist.gov/projects/cloud-computing.

* cited by examiner

REDUCING THE AMOUNT OF DATA TRANSFERRED TO REMOTE STORAGE LOCATIONS FOR MODIFIED OBJECTS

BACKGROUND

The present invention relates to data storage systems, and more specifically, this invention relates to maintaining updated copies of data across different storage locations in a distributed storage system.

Distributed storage systems attempt to offer the advantages of centralized storage with the scalability and cost base of local storage. Moreover, a distributed storage system can relate to block-level storage, file-based storage, or object-based storage (also referred to herein as "object store" or "object storage"). In case of block-level storage systems "distributed data storage" typically relates to one storage system in a tight geographical area, usually located in one data center, since performance demands are typically high. However, object-based storage systems can be located in one or more locations. Accordingly, geographically distributed storage systems are achievable.

For example, a distributed object store is made up of many individual object stores, each of which typically include a small number of physical storage disks. These object stores operate using commodity server hardware, which may include compute nodes or separate servers configured to provide storage services. As such, the hardware is relatively inexpensive. Moreover, a storage network is used to communicate between the various object stores.

Currently, regulatory bodies mandate the retention of critical data for significant periods of time for compliance purposes. Data is also retained for substantial amounts of time for other business purposes, such as historical analysis. In order to satisfy these requirements, organizations typically move data that is no longer being actively used (e.g., "cold" data) to storage types and/or locations which are less expensive, e.g., such as cloud-based storage. Object store is often the preferred storage format in cloud storage environments, as it offers significant scalability as well as allowing for the storage and retrieval of large amounts of data.

One of the ways which object storage derives its high scalability characteristics stems from the fact that it implements a simplified set of permitted operations ("Retrieval" and "Creation"). Object storage also imposes restrictions that objects are fundamentally immutable. Certain applications allow customers to migrate data from an on-premise file system to a cloud storage location. Moreover, these applications support the migration of "cold data" to the cloud location and also provide recall capabilities, both of which are done transparently to the on-premise applications.

SUMMARY

A computer-implemented method, according to one embodiment, includes: receiving, by a computer, a data access request; sending, by the computer, a recall request to a remote storage location for data which corresponds to the data access request; and receiving, by the computer, a copy of an existing object which includes blocks. The data which corresponds to the data access request is stored in at least one of the blocks. The data access request is satisfied, by the computer, by providing the copy of the existing object. Moreover, a sparse object, which only includes ones of the blocks which contain data that has been modified, is received by the computer. The sparse object is sent, by the computer, to the remote storage location; and one or more instructions to use the blocks included in the sparse object to update the existing object are also sent by the computer.

A computer-implemented method, according to another embodiment, includes: receiving, by the computer, a recall request from a remote location for data which corresponds to a data access request; and sending, by the computer, a copy of an existing object which includes more than one block to the remote location. The data which corresponds to the data access request is stored in at least one of the blocks. A sparse object is also received, by the computer, from the remote location. The sparse object only includes ones of the blocks which contain data that has been modified. Accordingly, the modified data in the blocks of the sparse object is used, by the computer, to update the existing object.

A computer program product, according to yet another embodiment, includes a computer readable storage medium having program instructions embodied therewith. The computer readable storage medium is not a transitory signal per se. Moreover, the program instructions readable and/or executable by a processor to cause the processor to perform a method which includes: sending, by the processor, a data access request; and receiving, by the processor, a copy of an existing object which includes blocks. Data which corresponds to the data access request is stored in at least one of the blocks. A snapshot of the received copy of the existing object is captured by the processor, and the received copy of the existing object is also used, by the processor, to perform a data operation. The snapshot is further used, by the processor, to determine ones of the blocks which include data that has been modified by the data operation. A sparse object which only includes the ones of the blocks determined as including modified data is thereby sent by the processor.

Other aspects and embodiments of the present invention will become apparent from the following detailed description, which, when taken in conjunction with the drawings, illustrate by way of example the principles of the invention.

DETAILED DESCRIPTION

Figure 1:
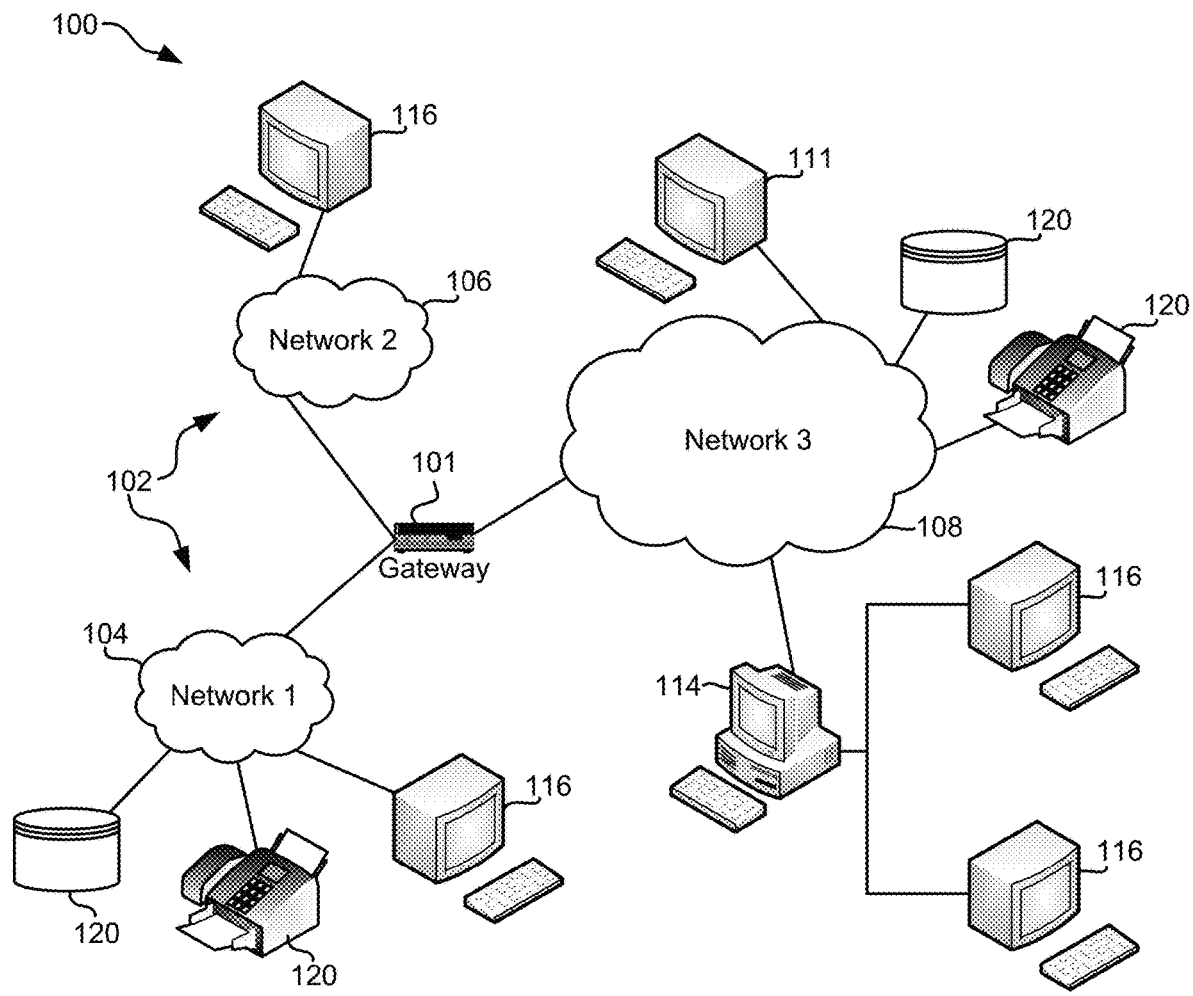
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products which are able to achieve significant improvements to the efficiency by which storage systems are able to manage data stored therein. Particularly, some of the embodiments described herein reduce the amount of data which is transferred between storage locations, thereby reducing the amount of network bandwidth, computational resources, system throughput, etc. consumed in order to satisfy received data requests and/or operations, e.g., as will be described in further detail below.

In one general embodiment, a computer-implemented method includes: receiving, by a computer, a data access request; sending, by the computer, a recall request to a remote storage location for data which corresponds to the data access request; and receiving, by the computer, a copy of an existing object which includes blocks. The data which corresponds to the data access request is stored in at least one of the blocks. The data access request is satisfied, by the computer, by providing the copy of the existing object. Moreover, a sparse object, which only includes ones of the blocks which contain data that has been modified, is received by the computer. The sparse object is sent, by the computer, to the remote storage location; and one or more instructions to use the blocks included in the sparse object to update the existing object are also sent by the computer.

In another general embodiment, a computer-implemented method includes: receiving, by the computer, a recall request from a remote location for data which corresponds to a data access request; and sending, by the computer, a copy of an existing object which includes more than one block to the remote location. The data which corresponds to the data access request is stored in at least one of the blocks. A sparse object is also received, by the computer, from the remote location. The sparse object only includes ones of the blocks which contain data that has been modified. Accordingly, the modified data in the blocks of the sparse object is used, by the computer, to update the existing object.

In yet another general embodiment, a computer program product includes a computer readable storage medium having program instructions embodied therewith. The computer readable storage medium is not a transitory signal per se. Moreover, the program instructions readable and/or executable by a processor to cause the processor to perform a method which includes: sending, by the processor, a data access request; and receiving, by the processor, a copy of an existing object which includes blocks. Data which corresponds to the data access request is stored in at least one of the blocks. A snapshot of the received copy of the existing object is captured by the processor, and the received copy of the existing object is also used, by the processor, to perform a data operation. The snapshot is further used, by the processor, to determine ones of the blocks which include data that has been modified by the data operation. A sparse object which only includes the ones of the blocks determined as including modified data is thereby sent by the processor.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
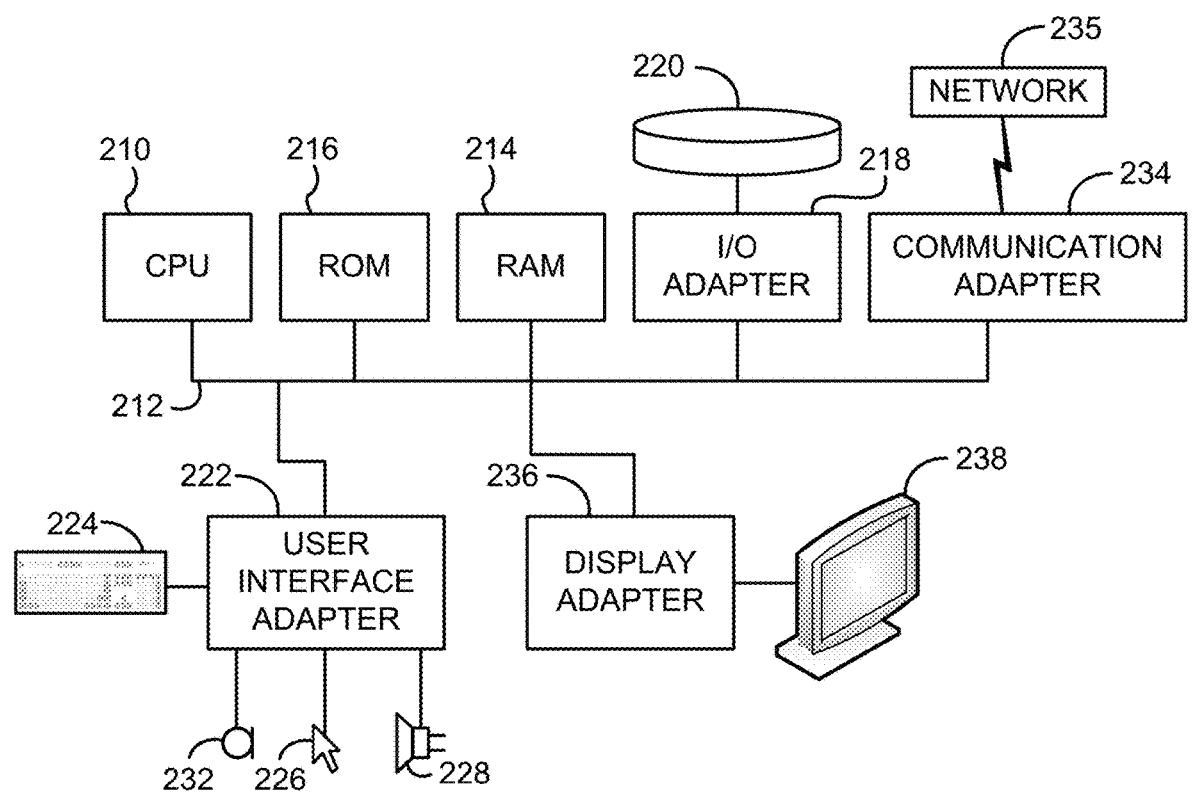
FIG. 2 is a representative hardware environment that may be associated with the servers and/or clients of FIG. 1, in accordance with one embodiment.

FIG. 2 shows a representative hardware environment associated with a user device 116 and/or server 114 of FIG.

1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
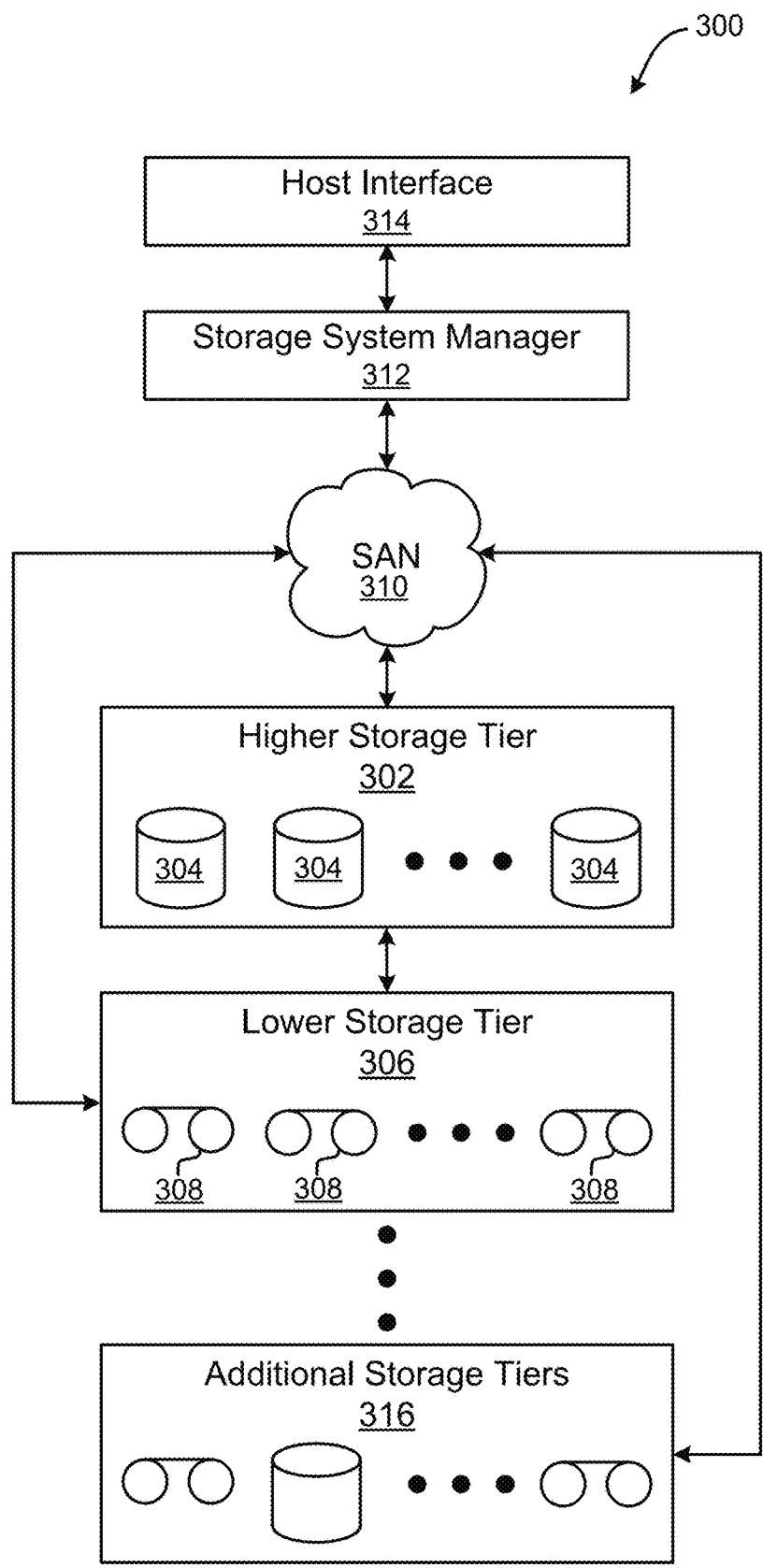
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, regulatory bodies often mandate the retention of certain data for significant periods of time for compliance purposes. Data is also retained for substantial amounts of time for other business purposes, such as historical analysis. In order to satisfy these requirements, organizations typically move data that is no longer being actively used (e.g., "cold" data) to storage types and/or locations which are less expensive, e.g., such as cloud-based storage. Object store is often the preferred storage format in cloud storage environments, as it offers significant scalability as well as allowing for the storage and retrieval of large amounts of data.

One of the ways which object storage derives its high scalability characteristics stems from the fact that it implements a simplified set of permitted operations ("Retrieval" and "Creation"). Object storage also imposes restrictions that objects are fundamentally immutable. Certain applications allow customers to migrate data from an on-premise file system to a cloud storage location. Moreover, these applications support the migration of "cold data" to the cloud location and also provide recall capabilities, both of which are done transparently to the on-premise applications.

Though the cold data is migrated to the cloud, there exist use cases which involve recalling the data back to the on-premise environment. Often times, this recalled data is then processed and updated before finally being archived back to the cloud storage location when it is no longer actively being used (becomes cold again). However, given the immutable nature of object store, these use cases have resulted in the entire object being recalled and subsequently archived back to the cloud storage location, even if only small portions of the entire object have been amended. This causes significant issues in conventional storage implementations, particularly when network bandwidths are constrained and large amounts of data is being transitioned between the different storage locations.

In sharp contrast to the aforementioned shortcomings, various ones of the embodiments included herein achieve significant improvements to the efficiency by which storage systems are able to manage data stored therein. Particularly, some of the embodiments described herein reduce the amount of data which is transferred between storage locations, thereby reducing the amount of network bandwidth, computational resources, system throughput, etc. consumed in order to satisfy received data requests and/or operations, e.g., as will be described in further detail below.

Figure 4:
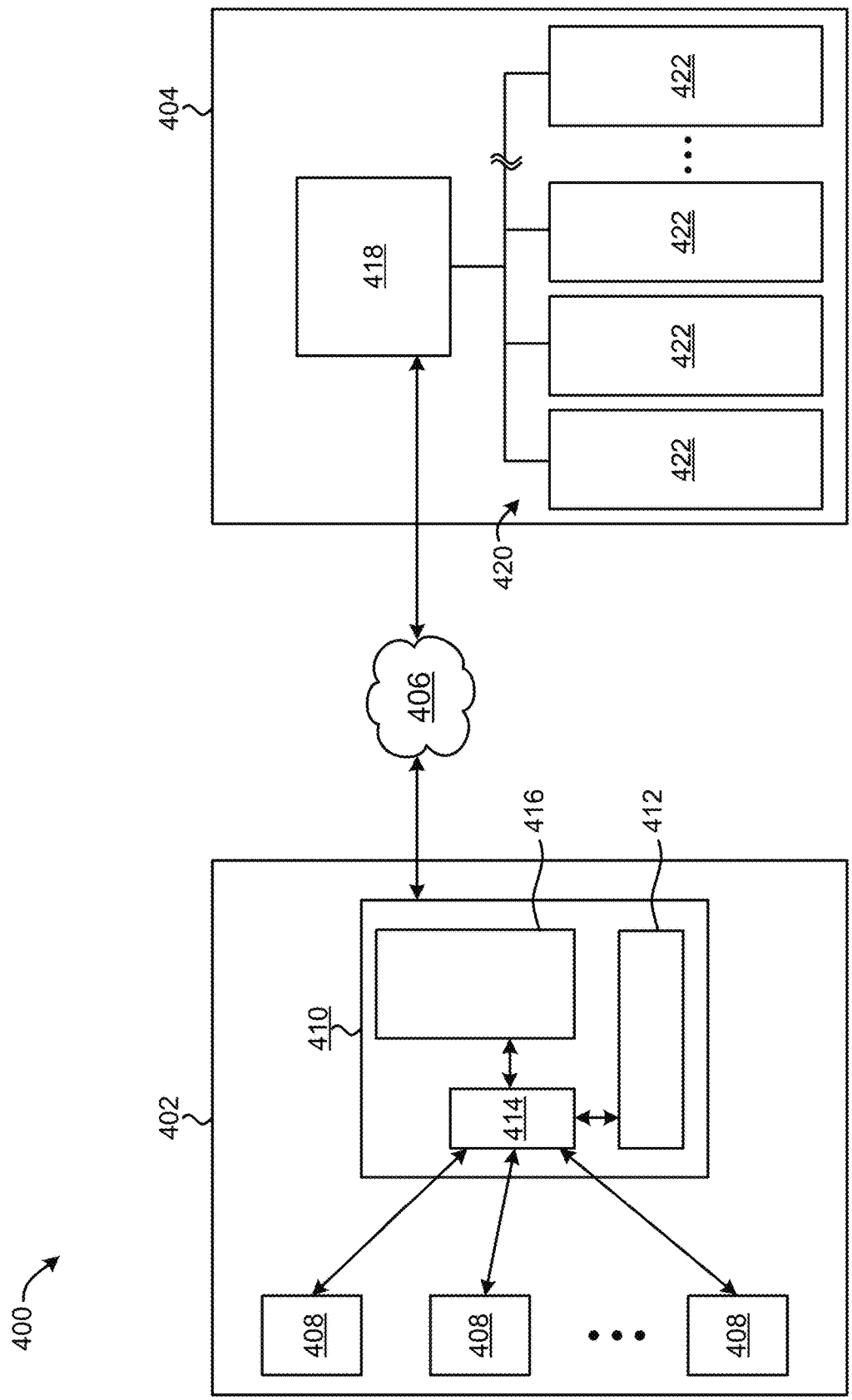
FIG. 4 is a partial representational view of a distributed storage system in accordance with one embodiment.

Looking to FIG. 4, a distributed storage system 400 is illustrated in accordance with one embodiment. As an option, the present storage system 400 may be implemented in conjunction with features from any other embodiment listed herein, such as those described with reference to the other FIGS. However, such storage system 400 and others presented herein may be used in various applications and/or in permutations which may or may not be specifically described in the illustrative embodiments listed herein. Further, the storage system 400 presented herein may be used in any desired environment. Thus FIG. 4 (and the other FIGS.) may be deemed to include any possible permutation.

As shown, the distributed storage system 400 includes an on-premise object store location 402 which is connected to a remote object store location 404 by a network 406. In preferred approaches, the remote object store location 404 is a cloud-based storage environment where data is archived. As such, the cloud-based storage environment may be a read-only environment which prevents data modification requests from being performed therein. However, the cloud-based storage environment is preferably able to update the data stored therein such that any updates, deletes, overwrites, new writes, etc. performed at the on-premise object store location 402 and/or elsewhere in the distributed storage system 400 are reflected at the cloud-based storage environment. Moreover, the remote object store location 404 may be managed and/or structured according to any desired type of cloud-based storage environment, e.g., as would be appreciated by one skilled in the art after reading the present description.

The network 406 may be of any type, e.g., depending on the desired approach. For instance, in some approaches the network 406 is a WAN, e.g., such as the Internet. However, an illustrative list of other network types which network 406 may implement includes, but is not limited to, a LAN, a PSTN, a SAN, an internal telephone network, etc. Accordingly, the on-premise object store location 402 and the remote object store location 404 are able to communicate with each other regardless of the amount of separation which exists therebetween, e.g., despite being positioned at different geographical locations.

Referring now to the on-premise object store location 402, a number of data access nodes 408 are in communication with a server 410. Depending on the approach, the data access nodes 408 may be coupled to the server 410 using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description. Moreover, the process of forming a communication link between one or more of the data access nodes 408 and the server 410 may implement any protocols and/or processes which would be apparent to one skilled in the art after reading the present description.

In some approaches, one or more of the data access nodes 408 serve as virtual machines which provide access to data stored in the distributed storage system 400. Thus, various ones of the data access nodes 408 may implement (e.g., run) any number of applications. According to an illustrative approach, which is in no way intended to limit the invention, one or more of the data access nodes 408 serve as a migration client which issues read operations, write operations, update operations, etc. received from a user and/or application being run thereby.

Looking to the server 410, a queue 412 is used in some approaches to manage data operations (e.g., requests) received from the various data access nodes 408. The queue 412 may manage the operations according to any desired structure. For instance, in some approaches the queue 412 processes the operations received in a first-in-first-out (FIFO) manner. However, in other approaches the 412 processes the operations received in a last-in-first-out (LIFO) manner.

The server 410 further includes a controller 414 which is coupled to the queue 412 as well as internal memory 416. According to some approaches, the internal memory 416 is used by the server 410 to temporarily store data being transitioned between one or more of the various data access nodes 408 and the remote object store location 404. It follows that the internal memory 416 may include any desired type of memory, e.g., such as RAM.

The remote object store location 404 also includes a controller 418 which is coupled to an array 420 of storage drives 422 (e.g., a memory array). As mentioned above, the remote object store location 404 is a read-only, cloud-based storage environment in some approaches, which prevents data modification requests from being performed therein. However, the remote object store location 404 is preferably able to update the data stored in the array 420 of storage drives 422, e.g., such that any updates, deletes, overwrites, new writes, etc. performed at the on-premise object store location 402 and/or elsewhere in the distributed storage system 400 are reflected at the remote object store location 404. Accordingly, the controller 418 is able to update the data stored in the array 420 of storage drives 422 in addition to being able to read the data stored therein.

Again, various ones of the embodiments included herein are able to reduce the amount of data which is transferred between the different storage locations of a distributed storage network, e.g., as a part of a data re-archival. For instance, cold data is typically migrated to a remote storage location (e.g., a remote cloud storage location) as part of a data archival procedure. Data archived at a remote storage location may be recalled to an on-premise location to perform updates thereto, access data therefrom, etc. However, once recalled data has become cold again, it is preferably returned to the remote storage location as part of a re-archival procedure. Various ones of the embodiments herein are able to reduce the amount of network bandwidth, computational resources, system throughput, etc. consumed in order to satisfy received data requests and/or operations, particularly during the re-archival procedure, e.g., as will soon become apparent.

Figure 5A:
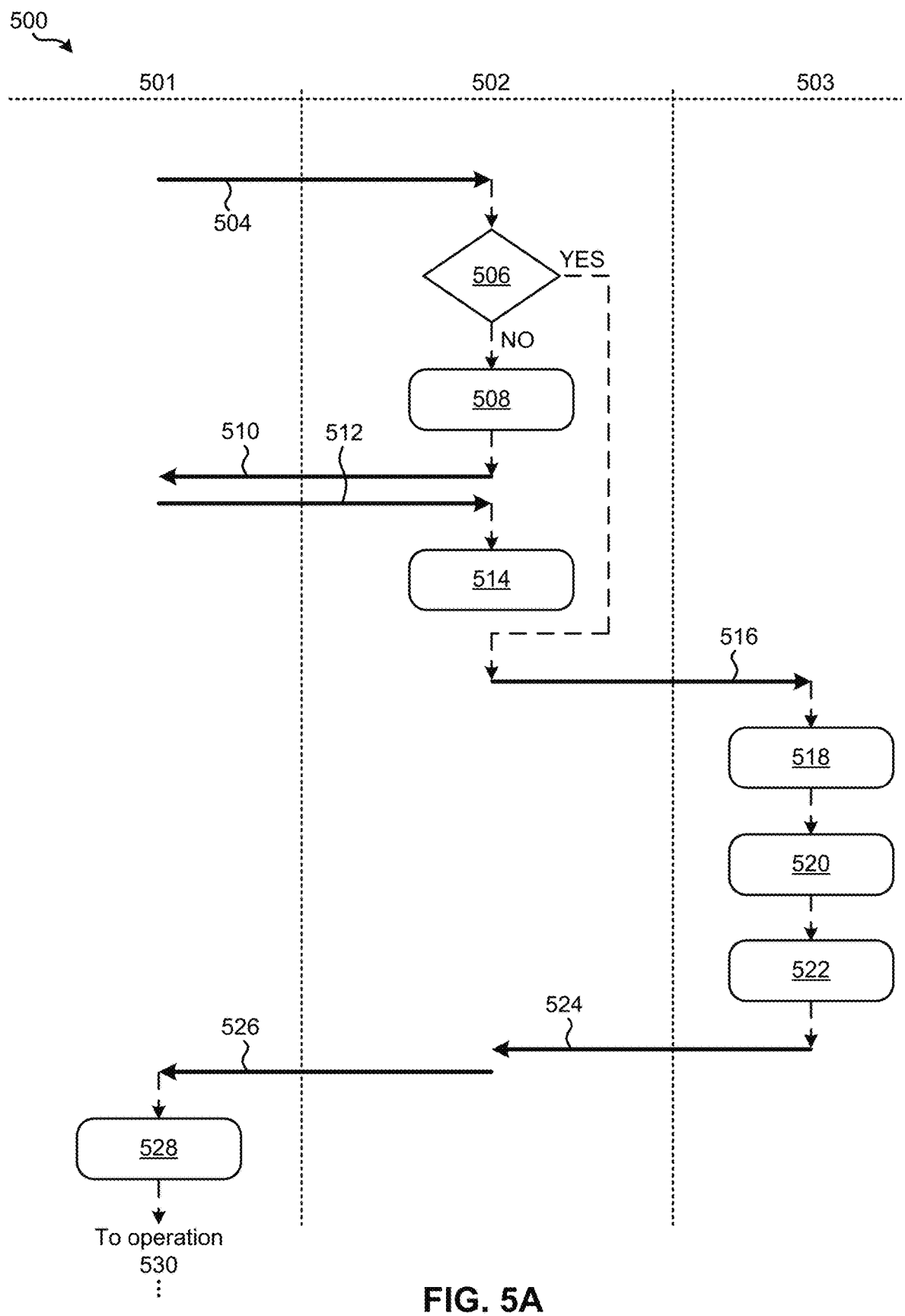
FIG. 5A is a flowchart of a method in accordance with one embodiment.
Figure 5A:
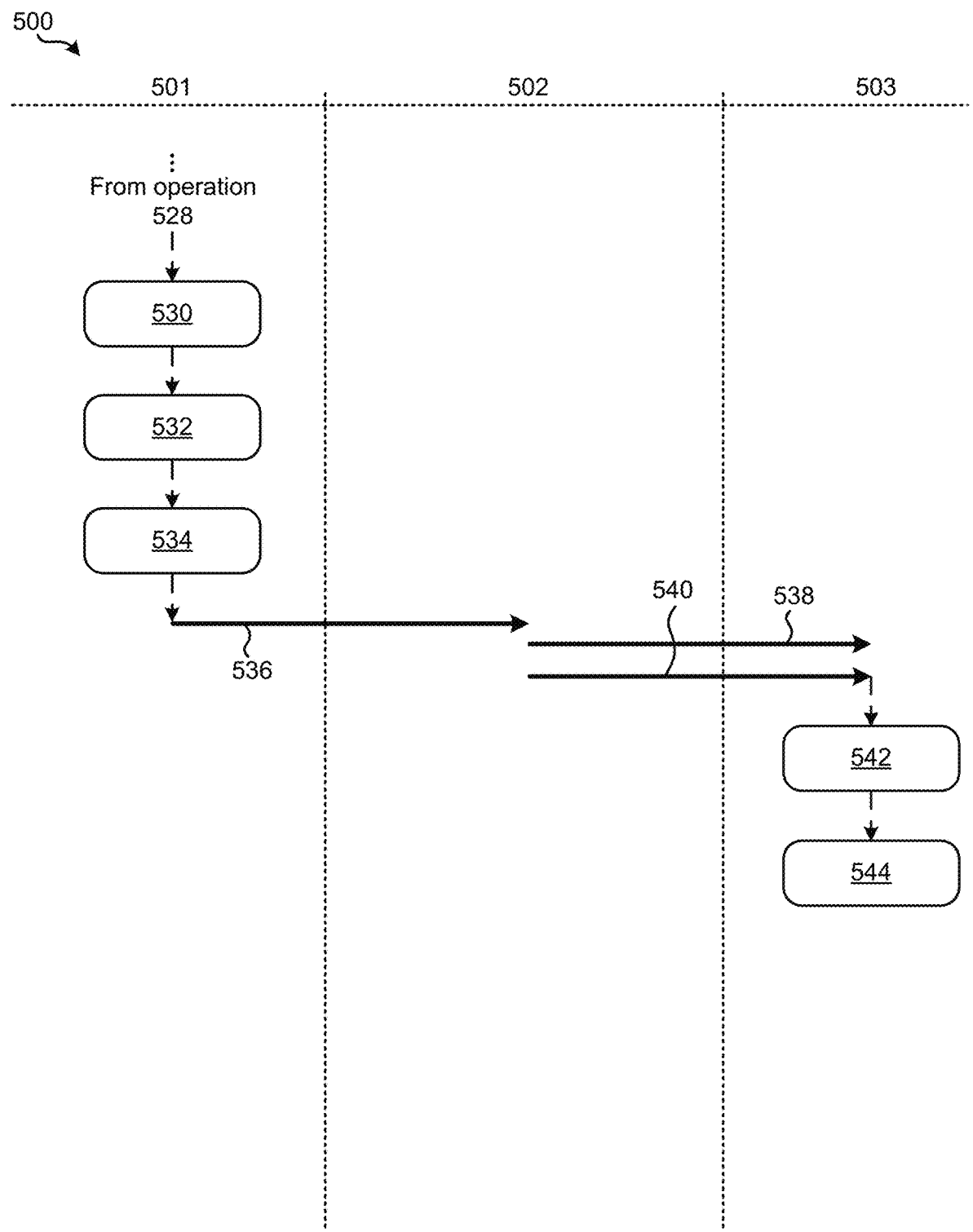

For instance, looking to FIG. 5A, a method a flowchart of a computer-implemented method 500 is shown according to one embodiment. The method 500 may be performed in accordance with the present invention in any of the environments depicted in FIGS. 1-4, among others, in various embodiments. Of course, more or less operations than those specifically described in FIG. 5A may be included in method 500, as would be understood by one of skill in the art upon reading the present descriptions.

Each of the steps of the method 500 may be performed by any suitable component of the operating environment. For example, each of the nodes 501, 502, 503 shown in the flowchart of method 500 may correspond to one or more processors positioned at a different location in a distributed data storage system. Moreover, each of the one or more processors are preferably configured to communicate with each other.

In various embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 5A includes different nodes 501, 502, 503, each of which represent one or more processors, controllers, computer, etc., positioned at a different location in a multi-tiered data storage system. For instance, node 501 may include one or more processors which are electrically coupled to, and/or included in, a data access node of a distributed data storage system (e.g., see data access nodes 408 of FIG. 4 above). Node 503 may include one or more processors which are electrically coupled to, and/or included in, a remote object store location of a distributed data storage system (e.g., see remote object store location 404 of FIG. 4 above). Furthermore, node 502 may include one or more processors which are electrically coupled to, and/or included in, a migration server of a distributed data storage system (e.g., see server 410 of FIG. 4 above), the migration controller being in communication with the one or more processors at each of nodes 501 and 503. Accordingly, commands, data, requests, etc. may be sent between each of the nodes 501, 502, 503 depending on the approach. Moreover, it should be noted that the various processes included in method 500 are in no way intended to be limiting, e.g., as would be appreciated by one skilled in the art after reading the present description. For instance, data sent from node 502 to node 503 may be prefaced by a request sent from node 503 to node 502 in some approaches.

As shown, operation 504 of method 500 includes sending a data access request to node 502. Accordingly, operation 504 includes sending a data access request from a data access node (e.g., migration client) to a migration server in some approaches. The type of data access request sent differs depending on the situation. For instance, in some approaches the data access request includes a read request, while in other approaches the data access request includes a write operation. Moreover, the type of write operation may also differ. For instance, a write request may be a "new" write request which involves writing a new object, file, etc. in memory, an "update" write request which involves overwriting at least some data already stored in memory, etc. depending on the approach.

The different types of data access requests effect the data in different ways. For instance, read requests typically involve accessing the requested data without actually making any changes thereto. However, modification related write requests (e.g., data updates) typically involve making changes to the data stored in memory. Thus, while more than one read request can be performed on the same data without issue, only one application at a time can be given access to modify a given portion of data (e.g., file) without causing corruption. Accordingly, different lock types are used in some approaches to identify the type of access request being performed and/or actually lock the given data in certain situations, e.g., such as those involving a write operation as would be appreciated by one skilled in the art after reading the present description.

It follows that in some approaches, a requested lock type which corresponds to the data access request is sent to node 502 along with the data access request. As mentioned above, the requested lock type may be a read lock or a write lock corresponding to the respective data.

Referring still to FIG. 5A, node 502 receives the data access request sent from node 501. Moreover, decision 506 includes determining whether the data which corresponds to the data access request is stored in memory at a remote storage location. In other words, decision 506 includes determining whether the requested data is stored locally (e.g., in memory which is directly accessible by the one or more processors at node 502), or located remotely (e.g., accessible by the one or more processors at node 503). In response to determining that the requested data is stored locally, method 500 proceeds to operation 508 which includes accessing the data from the local storage location. Furthermore, operation 510 includes satisfying the data access request by sending a copy of the requested data to node 501.

Although not shown in FIG. 5A, a lock type sent along with the data access request in some approaches may be used to protect the data from which the copy of the requested data was created. Moreover, for approaches in which the data access request sent in operation 504 involves actually making modifications to the requested data, a modified copy of the requested data is returned to node 502 as shown in operation 512. The modified copy of the requested data may thereby be used to update the data stored locally in memory. See operation 514.

Returning to decision 506, method 500 proceeds to operation 516 in response to determining that the requested data is not stored locally, but rather is stored remotely in memory at node 503. Accordingly, operation 516 includes sending a recall request to a remote storage location at node 503, the recall request being for the data which corresponds to the data access request. As mentioned above, in some approaches a requested lock type is received at node 502 along with the data access request. Thus, in some approaches the recall request is sent to node 503 along with the requested lock type. In other approaches, a requested lock type may be sent to node 503 along with the recall request regardless of whether a recall request was originally received from node 501 along with the original data access request. It follows that the one or more processors at node 502 may be able to determine the type of data access request received, as well as the lock type associated therewith.

Looking to node 503, the recall request is received from remote node 502. Again, the recall request is for data which corresponds to the data access request originally issued by node 501 (e.g., by a host, client, user, etc.). Moreover, operation 518 includes storing metadata which corresponds to the data access request. The metadata that is stored preferably indicates that the data which corresponds to the data access request has been (e.g., is currently) recalled. In some approaches, the metadata is correlated with the requested lock type and may be received along with the recall request. In other words, at least a portion of the metadata stored in operation 518 includes the requested lock type in some approaches. Moreover, the metadata may be stored in a central memory and/or any other storage location at node 503, e.g., depending on the desired approach.

Operation 520 further includes accessing an existing object in memory which includes the data indicated in the received recall request, while operation 522 includes creating a copy of the existing object. As would be appreciated by one skilled in the art, the existing object accessed in operation 520 includes one or more blocks of storage space therein. It follows that the requested data is included in at least one of the one or more blocks of storage space in the existing object.

Furthermore, operation 524 includes sending the copy of the existing object to node 502. Accordingly, the copy of the existing object which includes one or more blocks containing the requested data is received at node 502. This received copy of the existing object is thereafter used to satisfy the data access request received in operation 504 by providing (e.g., sending) the copy of the existing object to node 501. See operation 526.

Looking now to node 501, the copy of the existing object which includes the originally requested data is received. Moreover, a snapshot of the received copy of the existing object is captured in operation 528. This captured snapshot provides node 501 with a simple copy of the existing object as it was received, which also represents the object as it actually exists in memory at the remote storage location associated with node 503. Thus, the snapshot may be used to deduce which portions of the copy of the existing object are modified (if any), e.g., as will soon become apparent.

Operation 530 further includes using the received copy of the existing object to perform one or more data operations (e.g., read and/or write operations). At least some of the one or more data operations may correspond to the initial data access request. However, it should be noted that in some approaches a data operation which is different than that represented in the initial data access request may be performed using the received copy. In other words, a requested lock type sent along with the original data access request may not accurately reflect all of the data operations which are ultimately performed on the copy of the existing object. For example, the data access request originally sent in operation 504 may have been a read request. Accordingly, the requested lock type sent along with the data access request would indicate that a read type lock should be placed on the corresponding extent in the remote storage, thereby allowing other read requests to access the same object. However, upon receiving the requested data, a write request may be triggered for any number of reasons. In such situations it is preferred that an updated notification (e.g., lock type) is sent to the remote storage at node 503 which indicates that the data in the copy of the existing object will be, or has been, updated. Node 503 is thereby able to update the lock type currently issued on the existing object such that the integrity of the data is not compromised. Moreover, a snapshot of the existing object is preferably taken in response to detecting that an originally unanticipated write operation has been triggered.

In situations where the one or more operations do not include write operations or other types of operations which may otherwise cause any of the received data to be deleted, amended, and/or added to, the one or more operations may be performed on the received copy of the existing object without making any changes to the existing object in memory at remote node 503. However, approaches in which the one or more operations include making amendments to the data in the copy of the existing object involve additional processes. For instance, once the data in the copy of the existing object becomes sufficiently cold, it is preferably re-archived back to the remote storage location at node 503. Accordingly, operation 532 includes using the captured snapshot to determine ones of the blocks in the copy of the existing object which include data that has been modified by the one or more data operations. This determination is made in some approaches by comparing each block of data in the snapshot with the corresponding block in the modified object and noting any differences therebetween. However, any processes which would be apparent to one skilled in the art after reading the present description may be implemented in order to perform operation 532, e.g., such as a logical XOR process. It is also preferred that operation 532 is performed in response to determining that the one or more operations have completed, e.g., such that the determination does not need to be performed an unnecessary number of times, thereby conserving computational resources.

The blocks determined as including data which has been modified by the one or more data operations are used to form a sparse object. See operation 534. According to the present description, the "sparse object" is a partial version of the modified object which only includes the ones of the blocks which are determined as including modified or new data. In other words, the sparse object only includes the differences between the copy of the existing object received in operation 526 and the modified object resulting from the one or more data operations being performed thereon. It follows that a number of blocks included in the sparse object is fewer than a number of blocks included in the previously received copy of the existing object, and therefore a size of the sparse object is noticeably smaller than a size of the copy of the existing object.

Referring still to FIG. 5A, the sparse object is sent to node 502. See operation 536. The fewer number of blocks included in the sparse object reduces an amount of system resources consumed by the one or more processors at node 501 during the sending. Moreover, upon receiving the sparse object from node 501, node 502 sends the sparse object to the remote storage location at node 503. See operation 538. Again, the fewer number of blocks included in the sparse object (compared to the complete modified object) reduces an amount of the network bandwidth consumed by the one or more processors at node 502 during the sending. The reduced size of the sparse object in comparison to a size of the complete modified object also results in reduced system delays, faster update times, improved system efficiency, etc.

Furthermore, operation 540 includes sending one or more instructions to node 503 which specify that the blocks included in the sparse object are to be used to update the existing object. This update to the existing object is preferably performed by replacing blocks in the existing object which correspond to the modified blocks. As a result, the efficiency by which the existing object is updated is also improved as only the modified blocks are replaced, rather than the entire object.

Accordingly, operation 542 includes using the modified data in the blocks of the sparse object to update the corresponding blocks in the existing object, e.g., in accordance with the one or more instructions received in operation 540. Any processes of updating the blocks in the existing object which would be apparent to one skilled in the art after reading the present description may be implemented, e.g., depending on the desired approach. For instance, in some approaches an in-place modification is made to implement the modified data in the blocks of the sparse object.

Figure 5B:
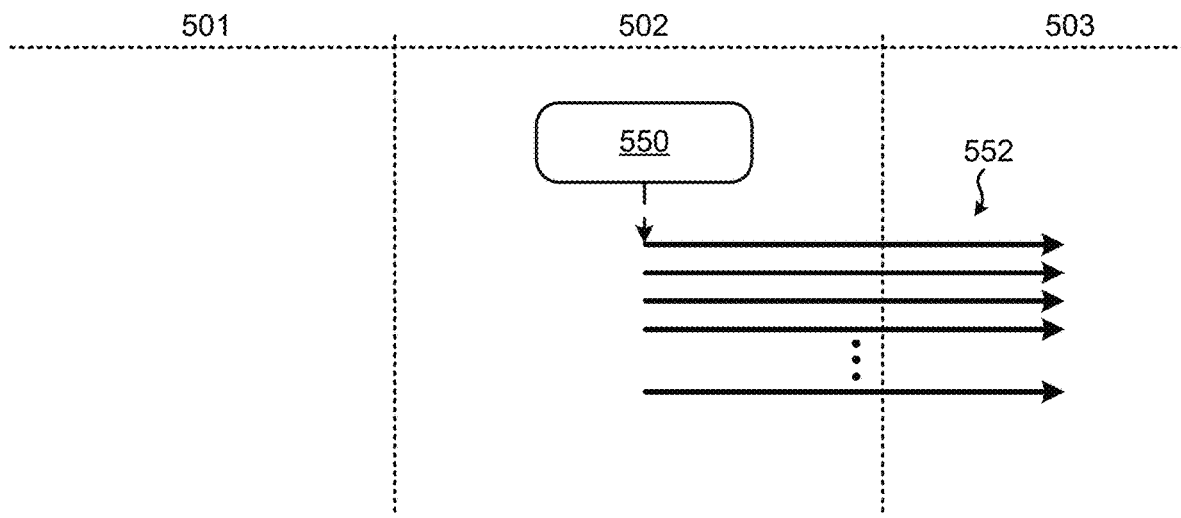
FIG. 5B is a flowchart of sub-processes for one of the operations in the method of FIG. 5A, in accordance with one embodiment.

For instance, referring momentarily to FIG. 5B, exemplary sub-processes of sending the sparse object to the remote storage location at node 503 are illustrated in accordance with one embodiment, one or more of which may be used to perform operation 538 of FIG. 5A. However, it should be noted that the sub-processes of FIG. 5B are illustrated in accordance with one embodiment which is in no way intended to limit the invention.

As shown, sub-operation 550 is performed at node 502 and includes separating the sparse object into a number of portions. Separating the sparse object into portions further reduces an amount of data which is transferred across the network which connects one or more of the nodes 501, 502, 503 at a given time. Accordingly, the separating is preferably performed such that a size of each of the number of portions is based on a network bandwidth which exists between nodes 502 and 503. Each of the portions are about the same size (include about the same amount of data) in some approaches, but in other approaches the size of some portions may be different than others. For example, the total size of the object may not be evenly divisible depending on the number of portions and/or size of each portion.

Sub-operation 552 includes asynchronously sending each of the number of portions to the remote storage location at node 503. The multiple arrows included in FIG. 5B are included to represent sending each of the number of portions. In preferred approaches each of the portions are sent in a temporally staggered manner. This reduces an amount of network bandwidth that is consumed by the process of sending the sparse object to the remote storage location at node 503. As a result, efficiency of the storage system is increased as network and computing resources are conserved. In some approaches a computer control timing protocol of a type known in the art is used to determine when each of the number of portions are sent to node 503. For example, a portion of the object is sent to node 503 in response to receiving an indication (e.g., signal) that the preceding portion has been successfully received.

Figure 5C:
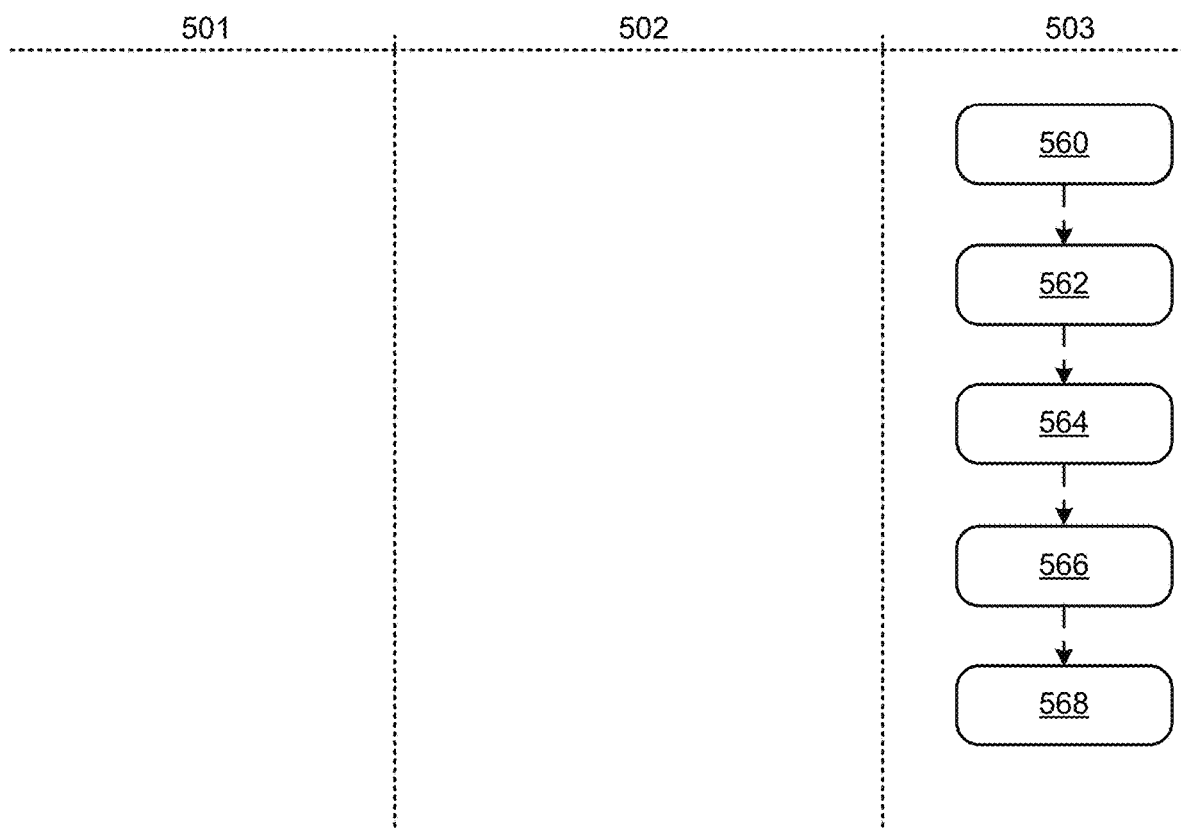
FIG. 5C is a flowchart of sub-processes for one of the operations in the method of FIG. 5A, in accordance with one embodiment.

Upon receiving one or more of the number of portions, node 503 uses the modified data in each of the portions to update the existing object in memory (e.g., see operation 542 in FIG. 5A). However, referring momentarily to FIG. 5C, exemplary sub-processes of using the modified data in the blocks of the sparse object to update the existing object. Accordingly, one or more of the sub-processes included in FIG. 5C may be used to perform operation 542 of FIG. 5A. However, it should be noted that the sub-processes of FIG. 5C are illustrated in accordance with one embodiment which is in no way intended to limit the invention.

Following the receipt of the sparse object, or portions thereof, sub-operation 560 includes retrieving a copy of the existing object from memory. Moreover, sub-operation 562 includes using the sparse object to update blocks in the copy of the existing object which correspond to the blocks that are included in the sparse object. In other words, sub-operation 562 includes using the updated data in the blocks of the sparse object to rewrite (e.g., replace) the data included in the corresponding blocks of the existing object. According to some approaches, sub-operation 562 is performed in a sequential manner such that each block of the sparse object is progressively used to update the existing object. However, in other approaches any desired process of using the modified data in the sparse object to update the corresponding data in the existing object may be used.

Following sub-operation 562, the flowchart includes storing the updated copy of the existing object in the memory. See sub-operation 564. Metadata corresponding to the organization of the objects in memory at node 503 may also be updated to reflect that the updated copy of the existing object has been stored to a new location in memory. See sub-operation 566. Furthermore, the existing object is deleted from the memory. See sub-operation 568.

Returning to FIG. 5A, from operation 542, the flowchart proceeds to operation 544, whereby method 500 may end. However, it should be noted that although method 500 may end upon reaching operation 544, any one or more of the processes included in method 500 may be repeated in order to process additional data access requests. In other words, any one or more of the processes included in method 500 may be repeated for data access requests subsequently received from one or more data access nodes (e.g., migration clients) at node 501.

Figure 5D:
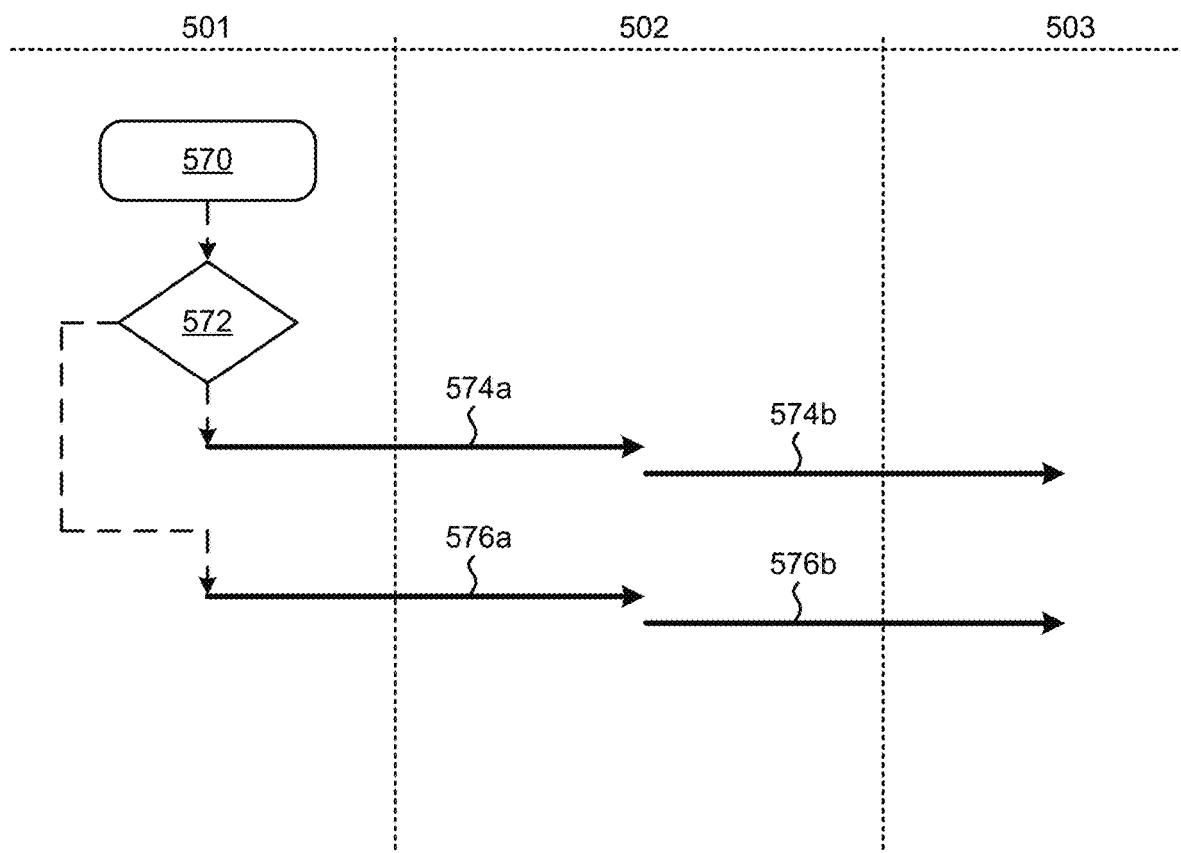
FIG. 5D is a flowchart of optional sub-processes which may supplement the operations in the method of FIG. 5A, in accordance with one embodiment.

Referring momentarily back to operations 536 and 538, although it is preferred that the sparse object is sent to remote node 503 in the interest of conserving system resources, some approaches may permit the transmission of the complete modified object. For example, FIG. 5D illustrates an exemplary set of optional sub-processes which may be performed in certain approaches to determine how much, or little, of the modified object should be sent to the remote storage location at node 503. Thus, any of the optional sub-processes included in FIG. 5D may be performed by the one or more processors at node 501 prior to performing operations 536 and 538 in FIG. 5A, thereby potentially changing the flow of method 500, e.g., as would be appreciated by one skilled in the art after reading the present description.

As shown, sub-operation 570 includes determining network bandwidth which exists between node 501 and the remote storage location at node 503. The network bandwidth may be determined a number of different ways depending on the approach. For instance, in some approaches the network bandwidth may be determined by querying a network management module. In other approaches, the network bandwidth may be determined by sampling one or more servers used to transfer data across the network.

Moving to decision 572, the network bandwidth determined in sub-operation 570 is used to determine whether to send the sparse object or a complete object to the remote storage location. According to an illustrative approach, which is in no way intended to limit the invention, the determination made in decision 572 depends on whether the current network bandwidth is below a threshold which may be selected by a user, preconfigured at a time that the network is established, updated in real-time, etc. In other words, the outcome of decision 572 is determined based on whether the network has the available bandwidth to handle transferring (e.g., sending) the larger object itself, or whether the current conditions of the network would benefit from the reduced amount of network bandwidth, computing power, system resources, etc. consumed by sending the sparse object. In some approaches, a current network quality of service is also considered in making the determination of decision 572, thereby desirably leading to a consistent model, e.g., as would be appreciated by one skilled in the art after reading the present description. As mentioned above, impact on the network may be even further reduced by separating the sparse object into a number of portions, each of which may be sent across the network asynchronously.

Accordingly, the flowchart of FIG. 5D proceeds to sub-operations 574a and 574b in response to determining that sending the complete object is justified in the present situation based on available network bandwidth. However, the flowchart proceeds to sub-operation 576a and 576b in response to determining that sending the sparse object (or portions thereof) is justified in the present situation based on available network bandwidth. Regardless of whether the complete object or the sparse object is sent to node 502, and in turn to the remote storage location, node 503 is able to use the modified data included therein to update the existing object, e.g., as described above with respect to FIG. 5A.

Thus, the sub-processes included in FIG. 5D may be used in some approaches to optimize the workflow by determine the network bandwidth between remote and on-premise locations. Moreover, the size of an object may be used to make determinations of most efficient data transfers which also satisfy given optimization criteria, e.g., such as bandwidth optimization, transfer rate optimization, etc.

It follows that various ones of the embodiments included herein are able to reduce the amount of data that is actually transferred between an on-premise location and a remote (e.g., cloud) storage location while also maintaining successful archival/recall procedures. This functionality can also be applied across remote storage tiers of a network in some approaches, thereby extending the effective application of these improvements. Moreover, actual network bandwidth is taken into consideration when performing some of the various processes included herein. Thus, some of the embodiments included herein achieve significant improvements to the efficiency by which storage systems are able to manage data stored therein. Particularly, some of the embodiments described herein reduce the amount of data which is transferred between storage locations, thereby reducing the amount of network bandwidth, computational resources, system throughput, etc. consumed in order to satisfy received data requests and/or operations.

It should be noted that although a number of the embodiments and approaches herein have been described in the context of object-based storage, this has been done by way of example only, and should not be deemed limiting on the invention defined in the claims. Rather, any desired type of data storage architecture may be implemented in conjunction with any of the embodiments and/or approaches included herein, e.g., as would be appreciated by one skilled in the art after reading the present description.

Similarly, it is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
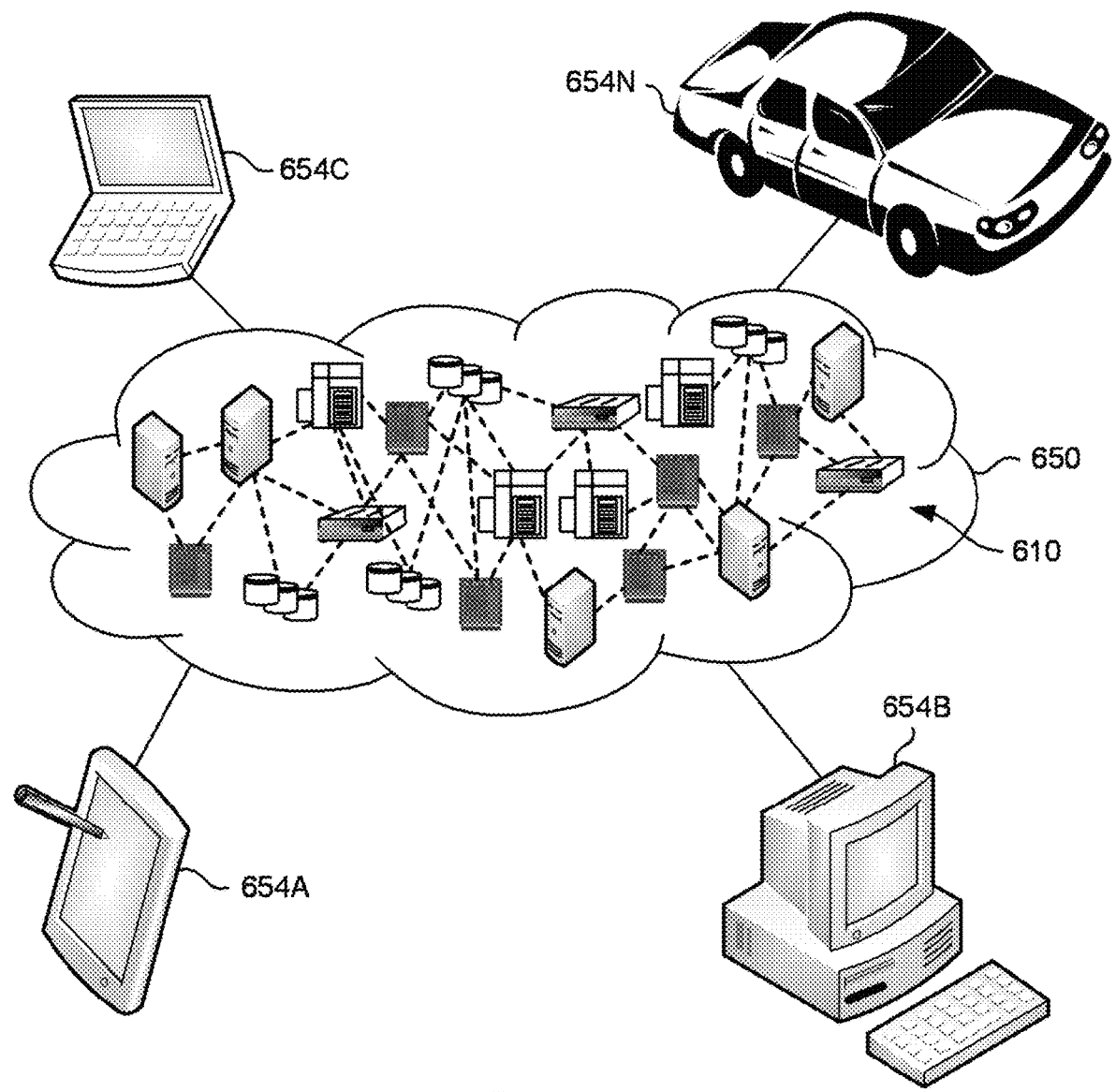
FIG. 6 is representational view of a cloud computing environment in accordance with one embodiment.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
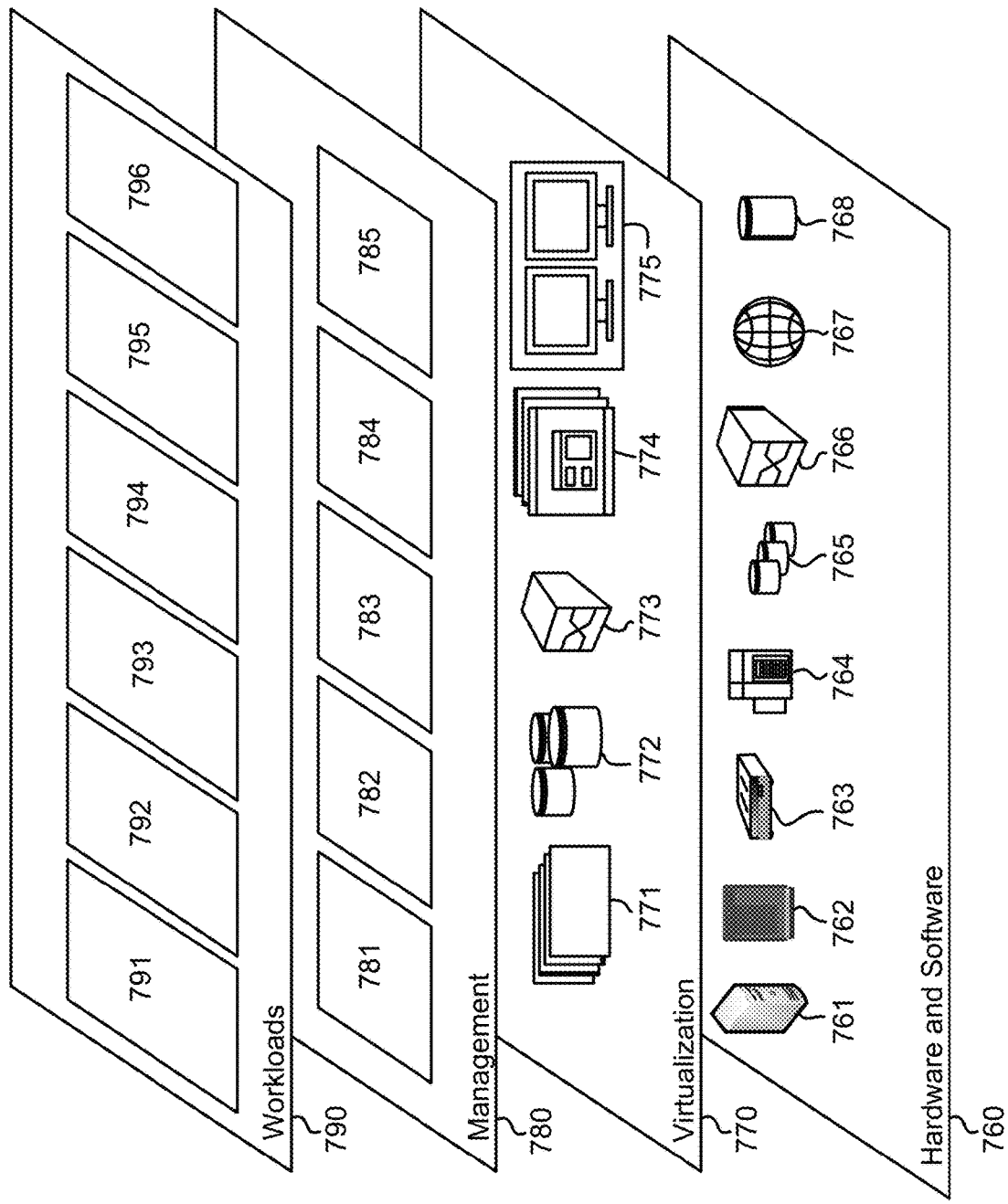
FIG. 7 is a representational view of abstraction model layers in accordance with one embodiment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and using sparse objects to reduce an amount of network bandwidth consumed by re-archival procedures 796.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   receiving, by a computer, a data access request;
   sending, by the computer, a recall request to a remote storage location for data which corresponds to the data access request;
   sending, by the computer, a lock type which corresponds to the data access request, wherein the lock type is sent to the remote storage location along with the recall request;

receiving, by the computer, a copy of an existing object which includes blocks, wherein the data which corresponds to the data access request is stored in at least one of the blocks;

satisfying, by the computer, the data access request by providing the copy of the existing object;

triggering, by the computer, a write request on the copy of the existing object, wherein the data access request is a read request;

sending, by the computer, an updated notification to the remote storage location, wherein the updated notification includes a new lock type which corresponds to the write request;

receiving, by the computer, a sparse object, wherein the sparse object only includes ones of the blocks which contain data that has been modified;

sending, by the computer, the sparse object to the remote storage location; and sending, by the computer, one or more instructions to use the blocks included in the sparse object to update the existing object.

2. The computer-implemented method of claim 1, comprising:

sending, by the computer, one or more instructions to update a current lock type issued on the existing object to reflect the new lock type which corresponds to the write request.

3. The computer-implemented method of claim 1, wherein the lock type is either a read lock or a write lock.

4. The computer-implemented method of claim 1, comprising:

determining, by the computer, network bandwidth which exists between the computer and the remote storage location;

determining, by the computer, a current network quality of service; and using, by the computer, the network bandwidth and the current network quality of service to determine whether to send the sparse object or a complete object to the remote storage location, wherein a number of the blocks included in the sparse object is fewer than a number of blocks included in the complete object, wherein the sparse object is sent to the remote storage location in response to determining to send the sparse object.

5. The computer-implemented method of claim 4, wherein the fewer number of blocks included in the sparse object reduces an amount of the network bandwidth consumed by the computer during the sending.

6. The computer-implemented method of claim 1, wherein the remote storage location is a cloud storage location.

7. The computer-implemented method of claim 1, comprising:

storing, by the computer, metadata which corresponds to the data access request, wherein the stored metadata includes the lock type, wherein the stored metadata indicates that the data which corresponds to the data access request has been recalled, wherein sending the sparse object to the remote storage location includes:

separating the sparse object into a second number of portions, wherein a size of each of the number of portions is based on a network bandwidth which exists between the computer and the remote storage location; and asynchronously sending each of the number of portions to the remote storage location such that each of the portions are sent in a staggered manner, wherein a current lock type issued on the existing object is updated to reflect a new lock type which corresponds to the write request, wherein receiving the sparse object includes:

receiving a first number of portions of the sparse object in response to a determination that the sparse object should be sent rather than a complete object based on: the network bandwidth which exists between the computer and the remote location, and a current network quality of service, wherein the lock type is either a read lock or a write lock.

8. A computer-implemented method, comprising:

receiving, by the computer, a recall request from a remote location for data which corresponds to a data access request;

receiving, by the computer, a lock type along with the recall request, wherein the lock type corresponds to the data access request;

sending, by the computer, a copy of an existing object which includes more than one block to the remote location, wherein the data which corresponds to the data access request is stored in at least one of the blocks;

issuing, by the computer, the received lock type on the existing object;

receiving, by the computer, an updated notification with a new lock type;

capturing, by the computer, a snapshot of the existing object in response to receiving the updated notification;

updating, by the computer, the lock type currently issued on the existing object by issuing the new lock type on the existing object;

receiving, by the computer, a sparse object from the remote location, wherein the sparse object only includes ones of the blocks which contain data that has been modified; and using, by the computer, the modified data in the blocks of the sparse object to update the existing object.

9. The computer-implemented method of claim 8, wherein using the modified data in the blocks of the sparse object to update the existing object includes:

retrieving a copy of the existing object from a memory;

using the modified data in the blocks of the sparse object to only update blocks in the copy of the existing object which correspond to the blocks that are included in the sparse object;

storing the updated copy of the existing object in the memory; and deleting the existing object from the memory.

10. The computer-implemented method of claim 8, comprising:

storing, by the computer, metadata which corresponds to the data access request, wherein the stored metadata includes the lock type, wherein the stored metadata indicates that the data which corresponds to the data access request has been recalled.

11. The computer-implemented method of claim 10, comprising:

performing, by the computer, a write request on a copy of the existing object in a memory, wherein the data access request is a read request, wherein a current lock type issued on the existing object is updated to reflect a new lock type which corresponds to the write request, wherein receiving the sparse object from the remote location includes:
receiving a number of portions of the sparse object in response to a determination that the sparse object should be sent rather than a complete object based on: a network bandwidth which exists between the computer and the remote location, and a current network quality of service,
wherein the lock type is either a read lock or a write lock.

12. The computer-implemented method of claim 8, wherein the computer is located at a cloud storage location.

13. The computer-implemented method of claim 8, comprising:
storing, by the computer, metadata which corresponds to the data access request, wherein the stored metadata includes the lock type, wherein the metadata indicates that the data which corresponds to the data access request has been recalled,
wherein receiving the sparse object from the remote location includes:
receiving a number of portions of the sparse object in response to a determination that the sparse object should be sent rather than a complete object based on: a network bandwidth which exists between the computer and the remote location, and a current network quality of service, wherein a number of blocks included in the sparse object is fewer than a number of blocks included in the complete object,
wherein each of the number of portions are received in a temporally staggered manner,
wherein a size of each of the number of portions is based on a network bandwidth which exists between the computer and the remote location.

14. A computer program product comprising a computer readable storage medium having program instructions embodied therewith, the program instructions readable and/or executable by a processor to cause the processor to perform a method comprising:
sending, by the processor, a data access request;
sending, by the processor, a lock type which corresponds to the data access request, wherein the lock type is sent along with the data access request;
receiving, by the processor, a copy of an existing object which includes blocks, wherein data which corresponds to the data access request is stored in at least one of the blocks;
capturing, by the processor, a snapshot of the received copy of the existing object;
using, by the processor, the received copy of the existing object to perform a data operation;
using, by the processor, the snapshot to determine ones of the blocks which include data that has been modified by the data operation; and
determining, by the processor, network bandwidth which exists between the computer and a remote storage location; and
using, by the processor, the network bandwidth to determine whether to send a sparse object or a complete object to the remote storage location, wherein the sparse object only includes the ones of the blocks determined as including modified data,
wherein a number of the blocks included in the sparse object is fewer than a number of blocks included in the complete object,
wherein the sparse object is sent to the remote storage location in response to determining to send the sparse object,
wherein sending the sparse object to the remote storage location includes:
separating the sparse object into a number of portions, wherein a size of each of the number of portions is based on a network bandwidth which exists between the computer and the remote storage location, and
asynchronously sending each of the number of portions to the remote storage location such that each of the portions are sent in a staggered manner.

15. The computer program product of claim 14, the program instructions readable and/or executable by the processor to cause the processor to perform the method comprising:
determining, by the processor, a current network quality of service; and
using, by the processor, the current network quality of service in addition to the network bandwidth to determine whether to send the sparse object or the complete object to the remote storage location.

16. The computer program product of claim 15, wherein the lock type is either a read lock or a write lock, wherein the program instructions are readable and/or executable by the processor to cause the processor to perform the method comprising:
triggering, by the processor, a write request on the copy of the existing object, wherein the data access request is a read request;
sending, by the processor, an updated notification to the remote storage location, wherein the updated notification includes a new lock type which corresponds to the write request;
sending, by the processor, one or more instructions to update a current lock type issued on the existing object to reflect the new lock type which corresponds to the write request; and
sending, by the processor, one or more instructions to the remote storage location to store metadata which corresponds to the data access request,
wherein the metadata which corresponds to the data access request includes the lock type,
wherein the metadata which corresponds to the data access request indicates that the data which corresponds to the data access request has been recalled.

17. The computer program product of claim 14, wherein the data access request is sent to a migration server which is in communication with a remote storage location.

18. The computer program product of claim 17, wherein the remote storage location is a cloud storage location.

19. The computer program product of claim 14, wherein a number of the blocks included in the sparse object is fewer than a number of blocks included in the received copy of the existing object, wherein the fewer number of blocks included in the sparse object reduces an amount of network bandwidth consumed by the processor during the sending.

* * * * *